United States Patent Office 3,525,439
Patented Aug. 25, 1970

3,525,439
DISTRIBUTION AND SLURRYING APPARATUS
Franklin K. Spragins, Edmonton, Alberta, Canada, assignor of thirty percent each to Cities Service Athabasca, Inc., a corporation of Delaware, Imperial Oil Limited, a Canadian corporation, Atlantic Richfield Corporation, a corporation of Pennsylvania, and ten percent to Royalite Oil Company, Limited, a Canadian corporation
Filed Nov. 4, 1968, Ser. No. 773,243
Int. Cl. B01d 21/24
U.S. Cl. 210—520                                            7 Claims

ABSTRACT OF THE DISCLOSURE

An apparatus for the primary separation of a bituminous emulsion from an aqueous slurry of tar sand is disclosed herein. The apparatus comprises a tank with a sand discharge port in its bottom, and a number of horizontally movable distributor arms connected to a rotatable vertical slurry feed tube. A rotating screw conveyer is axially mounted within each distributor arm, and acts both to move the slurry outwardly in the arm and to effectively disperse the slurry. Each distributor arm has a multiplicity of outlets along the sides thereof, preferably equally spaced with the outlet closest to the feed tube being on the top of the distributor arm and the outlet furthest from the feed tube being located on the bottom of the distributor arm while the intervening outlets are equally spaced in descending locations.

---

This invention relates to an extraction vessel for separating hydrocarbon material from an aqueous slurry of solids and hydrocarbon material. More particularly this invention relates to an apparatus for separating a bituminous emulsion from an aqueous slurry of tar sand.

The invention is directed to an apparatus for dispersing a slurry of particulate solids and hydrocarbon materials; uniformly distributing the slurried particulate solids in a separation vessel; separating the hydrocarbon material as an emulsion from the other solids, mostly sand; and removing the emulsion for further processing. Such a primary separation apparatus is particularly useful in the production of synthetic crude oil from a mineral hydrocarbon material such as tar sand or oil shale.

The commercial production of a synthetic crude oil from various hydrocarbon mineral deposits such as shale oil and bituminous tar said is becoming increasily important. It is presently felt that by 1980 a significant proportion of the feed for refinery operations will be from these sources. It is therefore important in developing these resources, that the synthetic crude oil product obtained be economically comparable on a cost basis with natural crude.

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred to herein as oil), from about 1% to about 10% of water, and from about 70% to about 90% of mineral solids. The specific gravity of the bitumen varies from about 1.0 to about 1.05 and the bitumen has an API gravity of about 8.0 degrees. This value for specific gravity as well as that of the specific gravity of any other material given herein is taken at 60% F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 microns. This smaller-size mineral solid material is referred to as "fines." The fines contain clay and silt including some very small particles of sand. The fines content typically varies from about 5% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling in a body of water, to recover an emulsion, or froth, which contains some of the fines and quantities of coarse sand. Such an emulsion or froth is referred to herein as a bituminous emulsion.

One well known method for preparing such emulsions is often referred to as the "hot-water process." In the hot-water process, the bituminous sand is slurried with steam and hot water and the pulp is then agitated with a stream of circulating hot water and carried to a separation apparatus maintained at an elevated temperature of about 180° F. In the separation apparatus, entrained air causes the bitumen to rise to the top of the cell in the form of an emulsion containing air, bitumen, water and mineral solids. The mineral solids are extremely difficult to separate from the bitumen and, unless the emulsion is further treated, it will generally contain at least 5% of mineral solids. This bituminous emulsion or froth can be subjected to water washing to effect a partial reduction in solids.

Understandably, all the different operations in treating the tar sands to obtain a synthetic oil must be maximized to product the product efficiently and economically, and it is therefore important that each step and treatment be adequate to obtain maximum yield at a minimum cost. The primary separation apparatus therefore must be able to handle significant quantities of slurry at a minimum cost and yield maximum efficiency. For best results it is important that the slurry material be evenly spread over the whole cross-sectional area of the separation zone to allow for maximum separation by gravity floatation of the bituminous emulsion from the sand and other solids. However as the primary separation vessel is scaled up to handle larger and larger volumes of material, it has been found that it becomes increasingly difficult to distribute the slurry feed material evenly throughout the cross-sectional area of the separation zone in the vessel.

I have therefore invented an apparatus for the primary separation of bituminous emulsion from an aqueous slurry of tar sand, the apparatus comprising a tank having a solids discharge port at the bottom thereof, and distributing means transversely mounted in the tank for introducing the slurry into the tank, the distributing means comprising a hollow, rotatable vertical feed tube, a plurality of cylindrical distributor arms communicatingly connected to and extending radially out from the feed tube, each arm having a multiplicity of outlets in the sides thereof, and conveying means in each of the arms for moving the slurry outwardly in the arms from the tube. Preferably the conveying means is a screw conveyer which also acts as a dispersing means by breaking up any agglomerates of materials found in the slurry. The multiplicity of ports in the arms are preferably equally spaced on the arms, those outlets closest to the feed tube being on the upper sides of the arms, and those furthest from the tube being on the bottom sides of the arms.

It is therefore an object of this invention to provide an apparatus for the primary separation of a bituminous emulsion from a slurry of tar sand.

Another object of this invention is to provide an apparatus for dispersing and distributing a slurry of tar sand in a separation vessel.

Still another object of this invention is to provide an apparatus capable of slurrying tar sand, and separating a bituminous emulsion therefrom.

Other objects and advantages of the apparatus of this invention will become apparent from the description of the drawings and embodiments which follows:

The drawing shows two views of the primary separation vessel of this invention, and a brief description of them is as follows.

Figure 1:
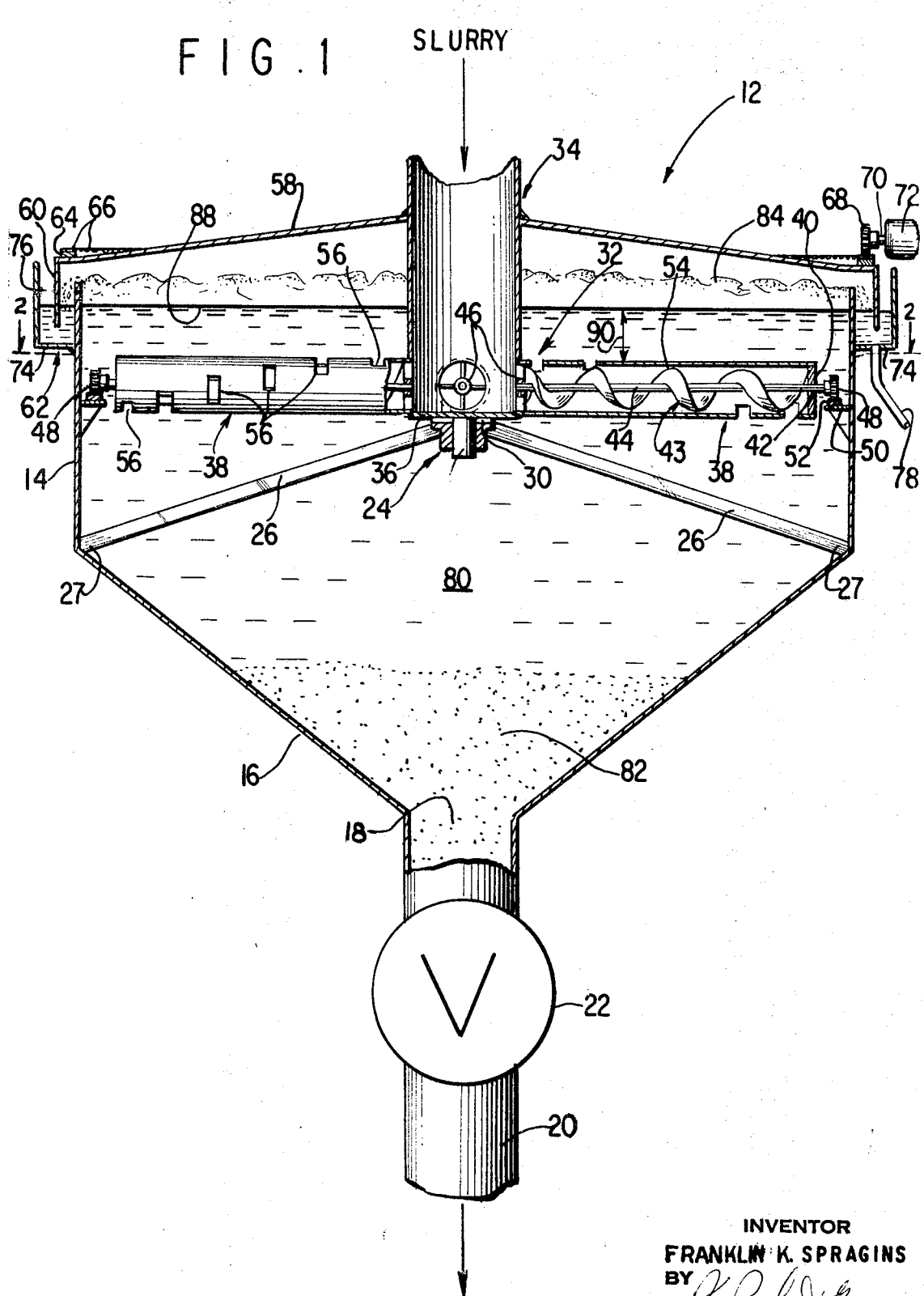
FIG. 1 is an elevation showing a cutaway view of the separation vessel.
Figure 2:
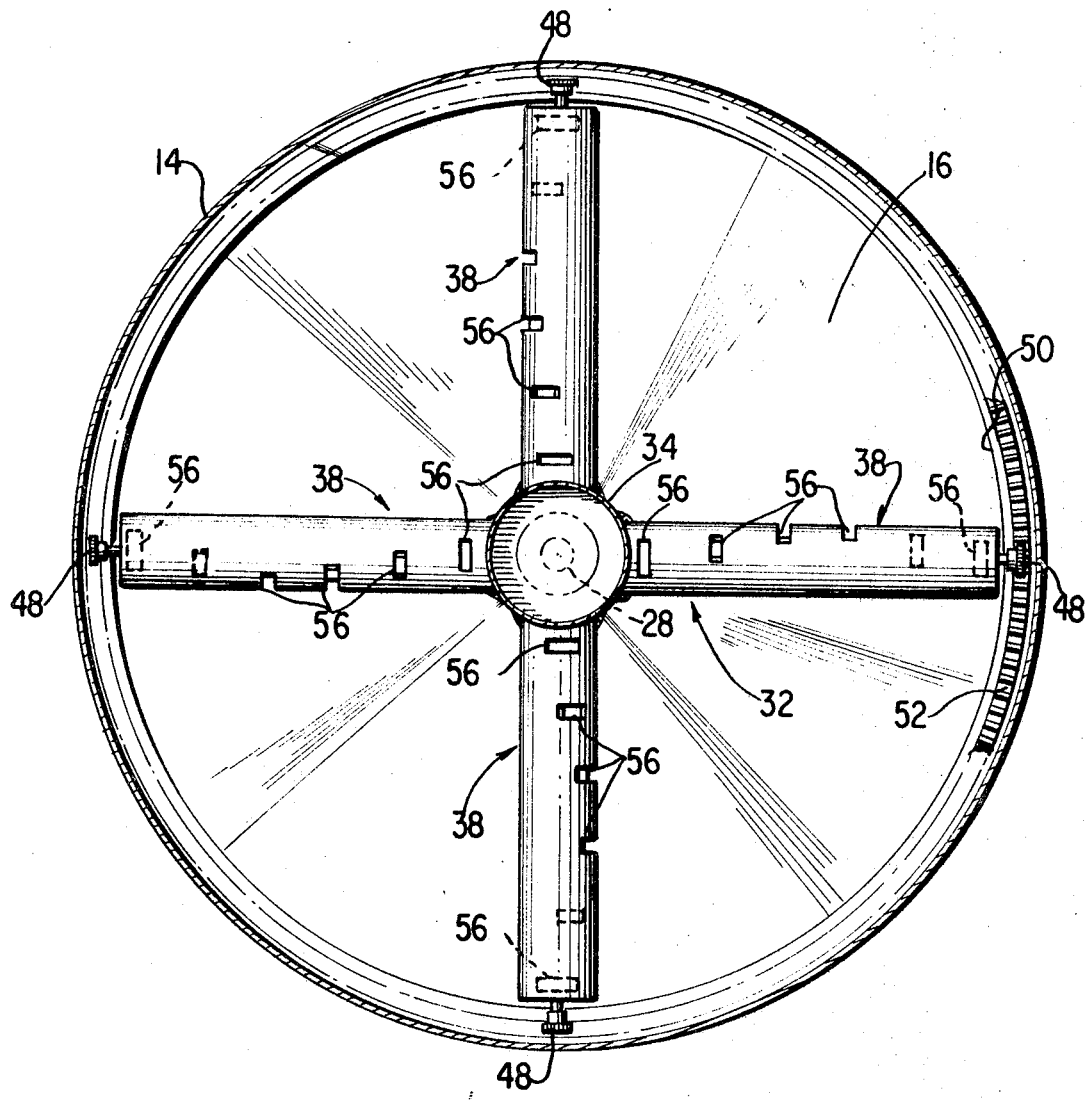
FIG. 2 is cross-sectional view of the separation vessel taken along section 2—2 of FIG. 1.

With reference to FIG. 1 of the drawings, a separation vessel 12 is shown, and comprises a vertically mounted cylindrical side wall 14 and a funnel shaped bottom 16. The top edge of the funnel shaped bottom 16 is connected to the bottom edge of the cylindrical wall 14. A solids discharge port 18 is located in the bottom of the vessel 12 and is formed by an opening in the bottom 16. A sand discharge conduit 20 is connected to port 18 and sand is periodically withdrawn from the vessel 12 by opening a valve 22 mounted in the sand discharge conduit 20.

Centrally located within the vessel 12 midway between the bottom and top edge of the side wall 14 is a distributing assembly support 24. The distributing assembly support 24 is supported by a set of four rigid beams 26, which are equally spaced from each other and attached at their distal ends 27 to the inside wall of the vessel 12 at points where the bottom 16 and side wall 14 are welded together. The beams 26 may be attached by welding or by utilizing other means such as brackets and bolts. The support 24 rotatably supports a distributing assembly 32. The distributing assembly 32 comprises a hollow vertical feed tube 34 and four equally spaced horizontal distributor arms 38.

The four distributor arms 38 each have an end cover 40 with a circular hole 42 centrally located therein. A screw conveyer 43 is rotatingly mounted in each of the distributor arms 38. The screw conveyer 43 acts to move material outwardly in the arms 38 from the feed tube 34. A screw conveyer shaft 44 is co-axially and rotatably mounted within each of the arms 38. Each shaft 44 is rotatably supported adjacent the feed tube 34 by a hangar 46 and is also rotatably mounted in and extends through the hole 42 in the end cover 40. Each screw conveyer shaft 44 is longer than the distance between hangar and the end cover of the arms so as to extend through the end cover 40 a sufficient distance in order to mount a drive gear 48 on the shaft outside the distributor arm.

An annular ring 50 is fixedly attached to the inside of the vessel wall 14 at a point just below the bottom of the screw conveyer drive gear 48. Fixedly mounted to the top of the annular ring 50 is an annular gear rack 52 attached either as a single unit or more preferredly as a multiplicity of semi-circular gear racks so as to form the annular gear rack 52 adjacent the circular path followed by the conveyer drive gear 48. The screw conveyer drive gear 48 and the annular rack 52 are both mounted in gear tooth contact with each other.

Rotation of the feed tube 34 will move the distirbutor arms 38 in a circular horizontal path which will cause the conveyer drive shaft 44 to be rotated as the drive gear 48 is rotated by the rack 52. Attached to the outside surface of each of the screw conveyer shafts is a metal helix 54 which forms a part of the screw conveyer and extends the length of the shaft from the hanger to the inside of the end cover. The pitch and direction of the helix is such that rotation of the shaft by the drive gear causes material contacting the helix to move outwardly towards the end of each of the arms.

A series of outlets 56 are located on each of the distributor arms and are preferably rectangular in shape with the longest side of the rectangle perpendicular to the axis of the arm. These outlets 56 nearest the feed tube are located at the top of the distributing arm while the outlets 56 furthest away from the feed tube are located on the bottom of the distributor arm. The intermediate outlets 56 are equidistantly spaced from each other and located in the wall of the distributor arm in descending order from their locations in the top of the arm nearest the feed tube to locations in the bottom of the arm furthest from the feed tube.

A vessel cover 58 is mounted on top of the vessel and is fixedly attached to the outside of the feed tube. The vessel cover 58 is a circular plate extending out over the top edge of the wall 14. A vertical cover flange 60 of relatively small width is fixedly attached to the outside of the vessel cover 58 at the edge thereof and serves to partially enclose a trap 62 for bituminous emulsion overflowing from the separation vessel.

Also mounted on the top surface of the vessel cover 58 and at its outer edge is a cover drive rack 64 formed of a multiplicity of gear teeth 66. A pinion gear 68 is mounted on a motor shaft 70 in rotating contact with the drive rack 64 and serves to rotate the top cover when the pinion gear 68 is rotated. The motor shaft 70 is attached to a motor 72 which is the primary power source for the distributing assembly 32.

On the outside of the vessel the emulsion removal trap 62 is formed by a flat horizontal ring 74 attached to the outside of the side wall 14 just below the cover flange 60, and having an upright rim 76 on the outside edge of the flat horizontal ring 74 to retain the overflow. The emulsion is removed from the trap 62 by emulsion removal conduit 78 which is connected to the bottom of the ring 74.

In operation a slurry of tar sand and water, or tar sand and water separately is fed through the feed tube to the distributor arms. The slurry delivered to the distributing arms may be partially or completely mixed. In some cases liquid and solid may be fed to the distributor arms separately with the actual slurry being formed within each of the distributing arms.

The motor rotates the vessel cover 58 which is fixedly attached to the feed tube 34 and therefore also rotates the feed tube at the same time. The rotation of the feed tube in turn causes the four distributor arms 36 to move in a horizontal plane within the separation vessel. The rotation of the distributor arms within the vessel moves the screw conveyer drive gears 48 along the annular rack within the vessel, thereby causing the gears to rotate the screw conveyer 43. The rotation of each of the screw conveyers 43 carries the slurry outwardly in the arms, while also at the same time subjecting the slurry to a dispersing action, which breaks up any conglomerates in the slurry, mixes the tar sand, entraps air, and evenly distributes material to each of the outlets in the arms. Uniform distribution of the slurry in the arms to each of the outlets is aided by the location of the respective outlets, those outlets closest to the feed tube being located on the top surface of the respective arms, while those furthest from the feed tube are located on the bottom of each of the arms.

The transverse movement of the arms in the horizontal plane of the vessel evenly distributes the material being ejected from the arm outlets over the whole cross-sectional area of vessel. If desired, the size of each of the outlets 56 in the arms 38 may be varied to achieve desired distribution patterns of the slurry over the iron sectional area of the vessel.

The slurry after being distributed over the cross-sectional area of the separation vessel separates into various of the tank and a lighter than water bituminous or oil emulsion phase 84 at the top of the liquid phase. The bituminous emulsion floats on the top of the liquid phase, thereby establishing an interface 88 between the water and the emulsion phases. The interface 88 is located below the top edge of the side wall 14 and above the distributor arms 38 a sufficient distance to provide a quiet zone 90 beneath the interface where the movement of the distributor arms and the flow from the outlets do not effect the flow pattern of the fluid in the zone 90. This allows for effective gravity separation of the solids and the bituminous emulsion from the slurry. The heavier than water solids sink by gravity to the bottom of the tank where they accumulate and are periodically withdrawn by opening the sand discharge valve 22. The bituminous emulsion, which is a mixture of aerated bitumen particles and water, rises to the top of the water phase and separates out as an emulsion floating on top of the water. The emulsion accumulates on the surface of the water and overflows over the top of the tank wall into the emulsion removal trap 62 where it is continuously withdrawn via the emulsion removal conduit 78 for further processing.

I claim:

1. An apparatus for separating hydrocarbon material from an aqueous slurry of hydrocarbon material and solids, said apparatus comprising:
   a vessel;
   solids discharge means for withdrawing solids from the vessel;
   feed means for feeding the aqueous slurry into the vessel;
   horizontally movable distributing means transversely mounted in said vessel for introducing the slurry into the vessel, said distributing means comprising at least one horizontally mounted distributor arm extending outwards from the center of the vessel and communicatingly connected to the feed means, said arm having longitudinally extending slurry outlet means, a screw conveyor axially mounted in the arm, and means for rotating said screw conveyor whereby material passing into the arm is positively conveyed outwardly in said arm, thereby acting to disperse the slurry and distribute hydrocarbon material uniformly into the vessel through the outlet means;
   drive means for moving said distributing means in the horizontal plane; and
   hydrocarbon emulsion withdrawal means communicatingly connected to an upper portion of said vessel for removal of hydrocarbon emulsion therefrom.

2. The apparatus of claim 1 wherein said longitudinally extending outlet means, comprises a multiplicity of longitudinally spaced outlets on said arm, the outlet closest to the feed means being located on the top side of the arm, the outlet furthest from the feed means being located on the bottom side of the arm, and the intervening outlets being spaced in descending locations on said arm.

3. The apparatus of claim 1 wherein said feed means comprises a vertically mounted rotatable feed tube communicatingly connected at the bottom thereof to said distributor arm, said feed tube being rotatably driven by the drive means.

4. The apparatus of claim 1 wherein said screw conveyor comprises a shaft rotatably mounted in said distributor arm and having an end extending beyond said arm, and a rotational drive means for rotating said shaft.

5. The apparatus of claim 4 wherein said rotational drive means comprises an annular gear rack mounted internally in said vessel adjacent the shaft end, and a gear mounted on said shaft end in mating contact with said annular gear rack.

6. An apparatus for separating hydrocarbon emulsion from an aqueous slurry of hydrocarbon material and solids, said apparatus comprising:
   a vessel;
   solids discharge means for withdrawing solids from the vessel;
   feed means for feeding the aqueous slurry into the vessel;
   horizontally movable distributing means transversely mounted in said vessel for introducing the slurry into the vessel, said distributing means comprising at least one horizontally mounted distributor arm extending outwards from the center of the vessel and communicatingly connected to the feed means, means for dispersing and conveying the slurry in the distributor arm, said arm having a multiplicity of longitudinally spaced outlets, the outlet closest to the feed means being located on the top side of the arm, the outlet furthest from the feed means being located on the bottom side of the arm, and intervening outlets being spaced in descending locations on said arm;
   drive means for moving said distributing means in a horizontal plane; and
   hydrocarbon emulsion withdrawal means communicatingly connected to an upper portion of said vessel for removal of hydrocarbon emulsion therefrom.

7. The apparatus of claim 6 wherein said feed means comprises a vertically mounted rotatable feed tube communicatingly connected at the bottom thereof to the distributing means, said feed tube being rotatably driven by the drive means.

References Cited
UNITED STATES PATENTS
2,787,378    4/1957    Battey _____ 210—520 X JAMES L. DeCESARE, Primary Examiner